US009284012B2

(12) United States Patent
Figueroa

(10) Patent No.: US 9,284,012 B2
(45) Date of Patent: Mar. 15, 2016

(54) ALL TERRAIN VEHICLE SUSPENSION DEVICE

(71) Applicant: Benjamin Figueroa, Philadelphia, PA (US)

(72) Inventor: Benjamin Figueroa, Philadelphia, PA (US)

(\*) Notice: Subject to any disclaimer, the term of this patent is extended or adjusted under 35 U.S.C. 154(b) by 46 days.

(21) Appl. No.: 14/287,236

(22) Filed: May 27, 2014

(65) Prior Publication Data

US 2015/0343870 A1 Dec. 3, 2015

(51) Int. Cl.
*B62K 25/04* (2006.01)
*B60G 7/00* (2006.01)
*B62K 5/00* (2013.01)

(52) U.S. Cl.
CPC ............... *B62K 25/04* (2013.01); *B60G 7/001* (2013.01); *B60G 2200/30* (2013.01); *B60G 2200/322* (2013.01); *B60G 2204/19* (2013.01); *B60G 2206/10* (2013.01); *B60G 2300/07* (2013.01); *B60G 2300/124* (2013.01); *B62K 2005/001* (2013.01)

(58) Field of Classification Search
CPC ............... B60G 9/02; B60G 2200/322; B60G 2300/07; B60G 2206/10; B60G 2200/30; B60G 2200/42; B60G 2204/19; B60K 17/165; B62K 25/283; B62K 25/04; B62K 5/01; B62K 5/027; B62K 5/025; B62K 2005/001
USPC ............ 280/124.156; 180/354, 358, 378, 227
See application file for complete search history.

(56) References Cited

U.S. PATENT DOCUMENTS

| 3,948,543 A * | 4/1976 | Macdonald | B62K 25/283 267/171 |
| 5,469,930 A * | 11/1995 | Wiers | B62K 25/283 180/219 |
| 7,494,142 B2 * | 2/2009 | Wolter | B60G 7/008 280/124.116 |
| 8,398,101 B2 * | 3/2013 | Alexander | B60G 13/005 280/124.116 |
| 8,403,092 B1 * | 3/2013 | Trethewey | B62K 25/283 180/227 |
| 2001/0027890 A1 * | 10/2001 | Bria | B60K 3/04 180/291 |
| 2003/0164257 A1 * | 9/2003 | Soileau | B62K 25/283 180/227 |
| 2005/0139407 A1 * | 6/2005 | Czysz | B62K 25/283 180/227 |
| 2008/0196960 A1 * | 8/2008 | Brown | B62K 25/283 180/227 |
| 2009/0065278 A1 * | 3/2009 | White | B62M 7/02 180/227 |
| 2009/0236820 A1 * | 9/2009 | Chang | B62K 5/027 280/283 |
| 2012/0211960 A1 * | 8/2012 | Bowers | B60G 9/02 280/124.111 |
| 2014/0191485 A1 * | 7/2014 | Yelvington | B62K 11/02 280/124.11 |

\* cited by examiner

*Primary Examiner* — Ruth Ilan
(74) *Attorney, Agent, or Firm* — Gulf Coast Intellectual Property Group

(57) ABSTRACT

A motorcycle suspension component operable to couple to an ATV. The motorcycle suspension component includes a first plate member and a second plate member that are parallel in manner being operably coupled intermediate an engine block and a gear differential. A shock-receiving member is mounted intermediate the first plate member and the second plate member and is perpendicular therewith. The shock-receiving member includes an upper portion that extends upward from the base. The first end of the first plate member and second plate member includes an angular edge having a first portion and a second portion. The second end of the first plate member and second plate member includes arcuate portions and two notches. A ornamentation area is included on the first plate member and second plate member.

8 Claims, 2 Drawing Sheets

ALL TERRAIN VEHICLE SUSPENSION DEVICE

PRIORITY UNDER 35 U.S.C SECTION 119(E) & 37 C.F.R. SECTION 1.78

This nonprovisional application claims priority based upon the following prior U.S. Provisional Patent Application entitled: L.D.F. Swingarm, Application No. 61/828,141, filed May 28, 2013, in the name of Benjamin Figueroa, which is hereby incorporated by reference for all purposes.

FIELD OF THE INVENTION

The present invention relates generally to motorcycle suspension components more specifically but not by way of limitation, a swing arm having a first plate and a second plate that is operable to extend the wheelbase of an ATV.

BACKGROUND

Millions of individual ride motorcycles on a daily basis in the United States. There are many different types of motorcycles which are manufactured with features designed to accommodate various terrains and riding styles. One popular type of motorcycle riding is off-road riding. Off-road riding is typically executed on a specialized off road motorcycle or an all terrain vehicle, known as a ATV or 4-wheeler. The ATV style of motorcycle provides a means in which a rider can traverse difficult and challenging terrain while providing rider and vehicle stability.

The ATV has a suspension system that is operable to provide a few core functions. First, the suspension system provides the control of steering and braking during use of the ATV. The suspensions system additionally provides absorption of terrain conditions so as to provide a rider with a more comfortable experience. An ATV's suspension typically consists of fork tubes in the front of the ATV and a swing arm in the rear. The swing arm is the main component of the suspension in the rear of the ATV and further provides a base for the rear axle to be mounted.

Conventional swing arms for ATV's are joined at a higher point than where the rear axle is connected. Most are configured to provide adequate spacing for the shocks to function. One problem with conventional swing arms is that they are not configured to inhibit the rear wheels from lifting upward during the use of the ATV over certain types of terrain. Additionally, another issue with conventional swing arms is that they are typically short in length and do not provide the suspension necessary to accommodate a second passenger, particularly on smaller ATV's.

Accordingly, there is a need for an ATV swing arm that is operable to substantially inhibit the rear wheels from lifting upward over certain terrains and further provide stability for a second passenger on smaller ATV's.

SUMMARY OF THE INVENTION

It is the object of the present invention to provide a swing arm for a smaller ATV that is operable to substantially inhibit the rear wheels from lifting upward during use on certain terrains.

Another object of the present invention is to provide a swing arm for an ATV that is operable to provide facilitation of carrying a second passenger.

A further object of the present invention is to provide a swing arm for a smaller size ATV that includes a first plate and a second plate that provide the operable connection intermediate the frame and the rear axle.

Yet another object of the present invention is to provide a swing arm for a smaller ATV having a first plate and a second plate wherein the first plate and the second plate are parallel.

Still a further object of the present is to provide a swing arm for a smaller ATV that includes a shock support plate intermediate the first plate and the second plate.

An additional object of the present invention is to provide a swing arm for a smaller ATV wherein the shock support plate is perpendicular the first plate and second plate.

Yet another object of the present invention is to provide a swing arm that includes brake line extension rod.

A further object of the present invention is to provide a swing arm that is manufactured from a lightweight strong metal.

Another object of the present invention is to provide a swing arm that includes engraved designs on the outer surfaces of the first plate and the second plate.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
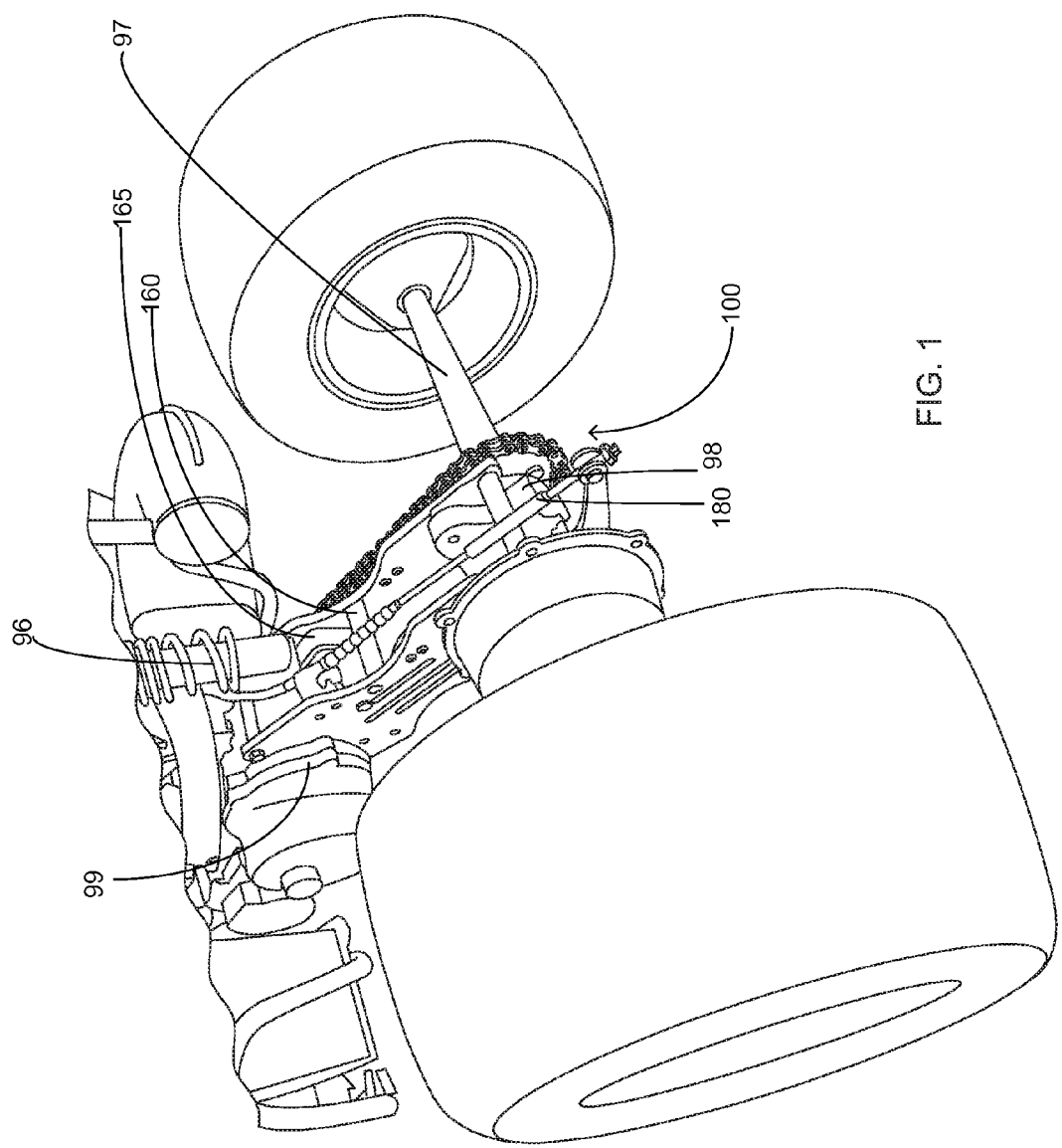
FIG. 1 is a perspective view of the preferred embodiment of the present invention installed on an exemplary ATV.

Referring now to the drawings submitted herewith, wherein various elements depicted therein are not necessarily drawn to scale and wherein through the views and figures like elements are referenced with identical reference numerals, there is illustrated a ATV suspension device 100 constructed according to the principles of the present invention.

Figure 2:
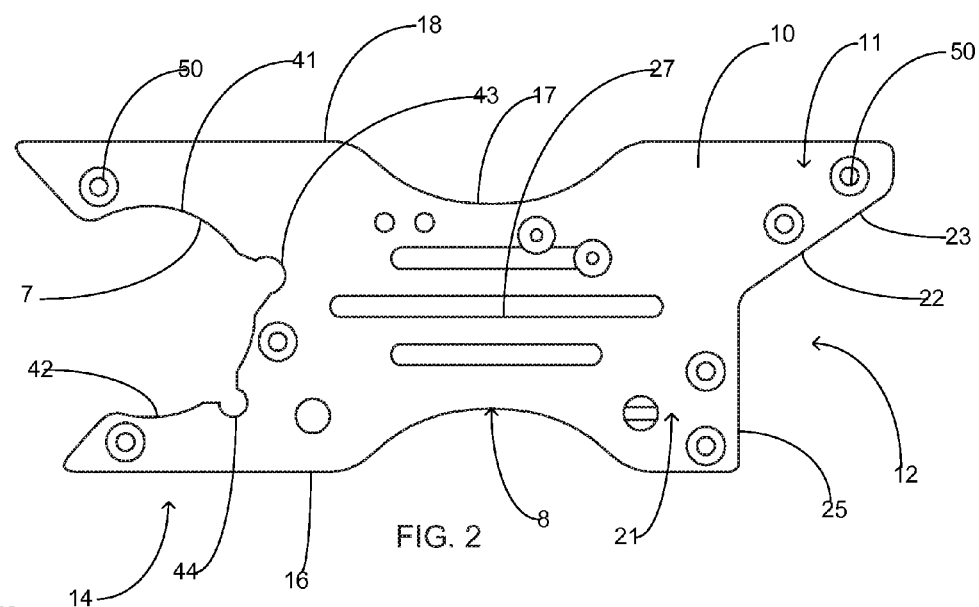
FIG. 2 is a side view of the first plate member of the present invention.
Figure 3:
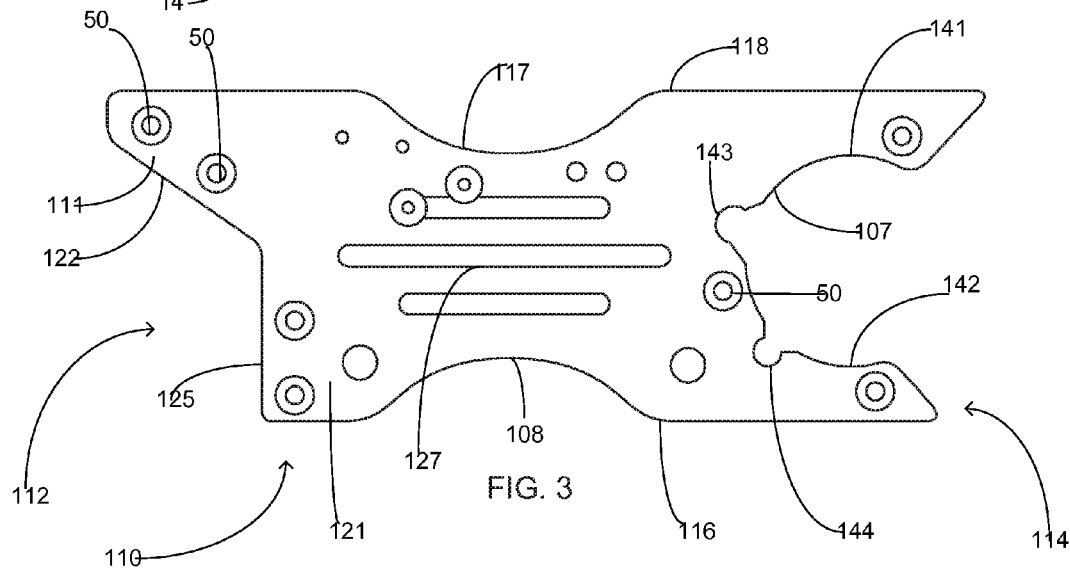
FIG. 3 is a side view of the second first plate member of the present invention.

The ATV suspension device 100 further includes a first plate member 10, illustrated in FIG. 2 herein. The first plate member 10 is planar in manner and is manufactured from a rigid durable material such as but not limited to aluminum. The first plate member 10 includes a first end 12 and a second end 14. Intermediate the first end 12 and second end 14 are lower edge 16 and upper edge 18. The first end 12 includes an upper portion 11 proximate the upper edge 18 that extends outward from the lower portion 21 of the first end 12. The first end 12 includes an angular shape defined by forward edge 22. The forward edge 22 is angular in manner wherein the portion 23 of forward edge 22 is angled with respect to the lower portion 25 of the forward edge 22. The forward edge 22 of the first end 12 are formed in an angular manner so as to mateably couple with an exemplary motorcycle engine block 99, as shown in FIG. 1 herein.

The upper edge 18 includes arcuate portion 17. Arcuate portion 17 projects inward towards the midpoint 27 of the first plate member 10. The arcuate portion 17 is shaped so as to assist the first plate member 10 to accommodate clearance for other motorcycle components. While a particular size and depth of the arcuate portion 17 is illustrated herein, it is contemplated within the scope of the present invention that the arcuate portion 17 could be formed in various different lengths and depths. The lower edge 16 also includes an arcuate portion 8 and is manufactured being of similar length and radious as arcuate portion 17 of the upper edge. Arcuate portion 8 provides similar functionality as arcuate portion 17 wherein arcuate portion 8 is formed to provide clearance for other motorcycle components.

Second end 14 is opposite first end 12 and includes edge 7. Edge 7 has a specific shape that includes at least an upper arcuate portion 41 and a lower arcuate portion 42. Further included in the shape of edge 7 is an upper notch 43 and a lower notch 44. The aforementioned elements of the edge 7 are formed so as to mateably couple with an exemplary gear differential 98 of a motorcycle. The first plate member 10 is structurally couples the exemplary engine block 99 and the exemplary gear differential 98 so as to move the rear axle 97 farther rearward than a conventional configuration. While the edge 7 is illustrated and described herein as being a particular shape, it is contemplated within the scope of the present invention that the edge 7 could be formed in numerous configuration wherein the configuration is operable to facilitate the mateable coupling of the edge 7 with an exemplary gear differential 98 of a motorcycle.

Journaled through the first plate member 10 are a plurality of apertures 50. The apertures 50 are round in shape and function to receive therethrough a mechanical fastener such as but not limited to a bolt so as to facilitate the mounting of the ATV suspension device 100. While a certain number and pattern of apertures 50 are illustrated herein, it is contemplated within the scope of the present invention that any number of apertures 50 in a variety of patterns could be journaled through the first plate member 10. The first plate member 10 further includes a surface ornamentation area 49. The surface ornamentation area 49 surrounds the midpoint 27 and includes ornamental grooves that are etched into the surface 2 of the first plate member 10. Those skilled in the art will recognize that the surface ornamentation area 49 could include numerous different designs applied using suitable durable techniques.

The second plate member 110 is constructed similarly to the first plate member 10. Once mounted to a motorcycle, the first plate member 10 and the second plate member 110 are parallel and aligned with each other. A more detailed description of the construction of the second plate member 110 is as follows. The second plate member 110 is planar in manner and is manufactured from a rigid durable material such as but not limited to aluminum. The second plate member 110 includes a first end 112 and a second end 114. Intermediate the first end 112 and second end 114 are lower edge 116 and upper edge 118. The first end 112 includes an upper portion 111 proximate the upper edge 118 that extends outward from the lower portion 121 of the first end 112. The first end 112 includes an angular shape defined by forward edge 122. The forward edge 122 is angular in manner wherein the portion 123 of forward edge 122 is angled with respect to the lower portion 125 of the forward edge 122. The forward edge 122 of the first end 112 are formed in an angular manner so as to mateably couple with an exemplary motorcycle engine block 99.

The upper edge 118 includes arcuate portion 117. Arcuate portion 117 projects inward towards the midpoint 127 of the second plate member 110. The arcuate portion 117 is shaped so as to assist the second plate member 110 to accommodate clearance for other motorcycle components. While a particular size and depth of the arcuate portion 117 is illustrated herein, it is contemplated within the scope of the present invention that the arcuate portion 117 could be formed in various different lengths and depths. The lower edge 116 also includes an arcuate portion 108 and is manufactured being of similar length and radious as arcuate portion 117 of the upper edge. Arcuate portion 108 provides similar functionality as arcuate portion 117 wherein arcuate portion 108 is formed to provide clearance for other motorcycle components.

Second end 114 is opposite first end 112 and includes edge 107. Edge 107 has a specific shape that includes at least an upper arcuate portion 141 and a lower arcuate portion 142. Further included in the shape of edge 107 is an upper notch 143 and a lower notch 144. The aforementioned elements of the edge 107 are formed so as to mateably couple with an exemplary gear differential 98 of a motorcycle. The second plate member 110 is structurally couples the exemplary engine block 99 and the exemplary gear differential 98 so as to move the rear axle 97 farther rearward than a conventional configuration. While the edge 107 is illustrated and described herein as being a particular shape, it is contemplated within the scope of the present invention that the edge 107 could be formed in numerous configuration wherein the configuration is operable to facilitate the mateable coupling of the edge 107 with an exemplary gear differential 98 of a motorcycle.

Referring in particular to FIG. 1 herein, the ATV suspension device 100 further includes a mounting plate 160 and a shock-receiving member 165. The mounting plate 160 is rectangular in shape and is manufactured from a suitable durable material such as but not limited to aluminum. The mounting plate 160 is operably coupled intermediate the first plate member 10 and the second plate member 110 proximate first ends, 12,112. The mounting plate 160 is positioned in alignment with at least one of the apertures 50 on the first plate member 10 and the second plate member 110 so as to facilitate the mechanical coupling of the mounting plate utilizing a conventional bolt or other suitable mechanical fastener. Secured to the mounting plate 160 and extending upward therefrom is the shock-receiving member 165. The shock-receiving member 165 is perpendicular to the mounting plate 160 and is configured to receive an end of an exemplary shock 96 utilizing conventional mechanical fasteners. Further included in the ATV suspension device 100 is a brake line extension rod 180. The brake line extension rod 180 is manufactured from a suitable durable material such as but not limited to metal tubing. The brake line extension rod 180 is operable to couple to the brake line of a motorcycle and extend the operable length thereof in order to accommodate the ATV suspension device 100. It is contemplated within the scope of the present invention that the brake line extension rod 180 could be manufactured in numerous lengths and diameters in order to achieve the desired functionality as described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A motorcycle suspension component operable to improve the ride of a motorcycle comprising:
   a first plate member, said first plate member being planar in manner and rigid, said first plate member having a first end and a second end, said first plate member having an upper edge and a lower edge, wherein said upper edge and said lower edge of said first plate member include an arcuate portion so as to allow for clearance of components;
   a second plate member, said second plate member being of similar size and shape as said first plate member, said second plate member being planar in manner and rigid, said second plate member having a first end and a second end, said second plate member having an upper edge and a lower edge, said upper edge and said lower edge of said second plate member including an arcuate portion so as to allow for clearance of components said first plate member and said second plate member include a plurality of apertures, said plurality of apertures being in alignment so as to receive a mechanical fastener, said first end of said first plate member and said first end of said second plate member further include an edge that is angular in configuration having a first portion and a second portion, wherein said second end of said second plate member and said second end of said first plate member include an edge that is operable to mateably couple with a gear differential;
   a shock receiving member, said shock receiving member being intermediate said first plate member and said second plate member and perpendicular therewith; and
   wherein the motorcycle suspension component is operably coupled intermediate a gear differential and an engine block.

2. The motorcycle suspension component as recited in claim 1, wherein said first plate member and said second plate member include an ornamentation area for etched designs.

3. A motorcycle suspension component operable to improve the ride of a motorcycle comprising:
   a first plate member, said first plate member being planar in manner and manufactured from aluminum, said first plate member having a first end and a second end, said first plate member having an upper edge and a lower edge, said first end operable to couple with a portion of an engine block, said second end operable to mateably couple with a gear differential;
   a second plate member, said second plate member being of similar size and shape as said first plate member, said second plate member being planar in manner and rigid, said second plate member having a first end and a second end, said first end operable to couple with a portion of an engine block, said second end operable to mateably couple with a gear differential said second plate member having an upper edge and a lower edge, said second plate member being mounted parallel with said first plate member;
   a shock receiving member, said shock receiving member being intermediate said first plate member and said second plate member and perpendicular therewith, said shock receiving member including a second portion that extends upward therefrom.

4. The motorcycle suspension component as recited in claim 3, wherein said first plate member and said second plate member include a plurality of apertures, said plurality of apertures being in alignment so as to receive a mechanical fastener.

5. The motorcycle suspension component as recited in claim 4, wherein said first plate member and said second plate member include an ornamentation area for etched designs.

6. The motorcycle suspension component as recited in claim 5, wherein said first end of said first plate member and said second plate member includes an edge that is angular in configuration having a first portion and a second portion.

7. The motorcycle suspension component as recited in claim 6, wherein said second end of said first plate member and said second plate member include a first and second arcuate portion and a first and second notch so as to mateably coupled with a gear differential.

8. The motorcycle suspension component as recited in claim 7, wherein said lower edge of said first plate member and said second plate member include a portion that is arcuate in shape so as to provide clearance.

* * * * *